(12) United States Patent
Reissman et al.

(10) Patent No.: US 9,733,820 B2
(45) Date of Patent: *Aug. 15, 2017

(54) METHODS, SYSTEMS AND COMPUTER READABLE MEDIA FOR PASTING DATA

(75) Inventors: Pierre-Jean Reissman, Villefranche sur Mer (FR); Tadhg Pearson, Waltham, MA (US); Jerome Mikaelian, Biot (FR); Elona Eski, Juan les Pins (FR); Guillaume Fournols, Bad Homburg (DE)

(73) Assignee: AMADEUS S.A.S., Biot (FR)

( * ) Notice: Subject to any disclaimer, the term of this patent is extended or adjusted under 35 U.S.C. 154(b) by 634 days.

This patent is subject to a terminal disclaimer.

(21) Appl. No.: 14/119,204

(22) PCT Filed: Jun. 14, 2012

(86) PCT No.: PCT/EP2012/002514
§ 371 (c)(1),
(2), (4) Date: Apr. 1, 2014

(87) PCT Pub. No.: WO2012/171645
PCT Pub. Date: Dec. 20, 2012

(65) Prior Publication Data
US 2014/0215372 A1      Jul. 31, 2014

(30) Foreign Application Priority Data

Jun. 15, 2011   (EP) .................................... 11305747

(51) Int. Cl.
G06F 3/0486       (2013.01)
G06F 9/54         (2006.01)
(52) U.S. Cl.
CPC ............ G06F 3/0486 (2013.01); G06F 9/543 (2013.01)

(58) Field of Classification Search
None
See application file for complete search history.

(56) References Cited

U.S. PATENT DOCUMENTS 5,564,044 A    10/1996  Pratt
6,192,380 B1    2/2001  Light et al.
(Continued)

FOREIGN PATENT DOCUMENTS

CN    1530833     9/2004
CN    1670704     9/2005
(Continued)

OTHER PUBLICATIONS

Japanese Patent Office, Office Action issued in corresponding Application No. 2014-515095 issued Sep. 29, 2015.
(Continued)

*Primary Examiner* — Abdullah Al Kawsar
*Assistant Examiner* — David Luu
(74) *Attorney, Agent, or Firm* — Thompson Hine LLP

(57) ABSTRACT

A method of pasting data from a source application to a destination application, where the source and destination applications are not the same; the method comprising the steps of: identifying whether the data is of text or graphics data type and selecting a text input handler if a text data type is identified and a graphics input handler if a graphics data type is identified; converting the data using the text or graphics input handler to a standard format for pasting based on the identified data type; determining semantics of the data in the standard format for pasting and a location of the user in the destination application, to which the data is to be pasted; determining which portions of the data are to be pasted to which areas of the determined location in the destination application, depending on the determined semantics of the data and the location of the user in the
(Continued)

destination application; and pasting the data to the respective areas of the destination application.

17 Claims, 9 Drawing Sheets

(56) References Cited

U.S. PATENT DOCUMENTS

| | | |
|---|---|---|
| 6,704,770 B1 | 3/2004 | Ramakesavan |
| 7,735,017 B2 | 6/2010 | Cunningham et al. |
| 8,429,551 B2 | 4/2013 | Kim et al. |
| 8,943,515 B2* | 1/2015 | Reissman ............ G06F 3/0486 715/769 |
| 2004/0172584 A1 | 9/2004 | Jones et al. |
| 2005/0091603 A1* | 4/2005 | Chen ..................... G06F 9/544 715/769 |
| 2005/0117910 A1 | 6/2005 | Foote et al. |
| 2006/0059247 A1 | 3/2006 | Marappan et al. |
| 2007/0035745 A1* | 2/2007 | Izumi ................... G06F 17/211 358/1.1 |
| 2008/0109832 A1 | 5/2008 | Ozzie et al. |
| 2008/0256433 A1 | 10/2008 | Aureglia et al. |
| 2009/0013248 A1 | 1/2009 | Hutchison et al. |
| 2009/0276723 A1 | 11/2009 | Narayanan et al. |
| 2009/0292994 A1 | 11/2009 | Lwo |
| 2009/0328068 A1 | 12/2009 | Iguchi et al. |
| 2011/0047506 A1 | 2/2011 | Miller |
| 2011/0126092 A1 | 5/2011 | Harris |
| 2012/0246573 A1 | 9/2012 | Arokiaswamy |
| 2012/0284646 A1 | 11/2012 | Sitrick et al. |

FOREIGN PATENT DOCUMENTS

| | | |
|---|---|---|
| EP | 1452966 A2 | 9/2004 |
| JP | 2010519611 A1 | 6/2010 |
| WO | 2008100939 A1 | 8/2008 |

OTHER PUBLICATIONS

Weihai Li, Doctored JPEG Image Detection, 2008 IEEE International Conference on Multimedia and Expo, pp. 253-256 Jun. 23, 2008.

Liu Changde, Copy webpage to Word: Freedom of Table Copying, Computer Knowledge and Technology, pp. 33-34 May 5, 2011.

State Intellectual Property Office, Official Action issued in Application No. 201280029038.0 Jun. 17, 2016.

European Patent Office, Official Action issued in Application No. 11 305 747.5 dated Oct. 10, 2013.

USPTO, Notice of Allowance issued in U.S. Appl. No. 13/184,480 dated Nov. 6, 2014.

USPTO, Office Action issued in U.S. Appl. No. 13/184,480 dated Aug. 30, 2013.

USPTO, Office Action issued in U.S. Appl. No. 13/184,480 dated Feb. 15, 2013.

European Search Report for European Patent Application No. 11305747.5 dated Dec. 16, 2011.

Stylos et al., "Citrine: Providing Intelligent Copy-andPaste," CiteSeer Proceedings of UIST 04, vol. 6, No. 2 pp. 185-188 (Oct. 27, 2004).

European Patent Office, Search Report and Written Opinion issued in PCT/EP2012/002514 dated Aug. 20, 2012.

The State Intellectual Property Office of the People's Republic of China, Second Official Action issued in Application No. 201280029038.0 dated Feb. 4, 2017.

* cited by examiner

METHODS, SYSTEMS AND COMPUTER READABLE MEDIA FOR PASTING DATA

FIELD OF THE INVENTION

The present invention relates to a method and system for improving the pasting of information or data, particularly but not exclusively, between different applications.

BACKGROUND OF THE INVENTION

It is common practice, in many situations, to copy data or information from one place and paste it to another place. This is typically done in a computer related environment where data is copied and pasted between different applications, documents, etc.

In the travel industry, a significant number of different applications exist in many different contexts. In the case of bookings for example, there may be front office applications, middle office applications, applications for invoicing and payment or any other appropriate type of application. What ever the circumstance applications are becoming more and more integrated and the need to transfer data from one application to another continues to grow.

An internal system may offer seamless integrations of numerous standalone applications in all relevant products of that system. However, most systems need to communicate with external applications and there is often a need to exchange data from an external application to an internal one or vice versa.

It is not always possible for a complete integration between all applications and manual action or intervention may be required. This can often mean a user needs to carry out extensive copy and paste operations to share the required information between the applications. This would require a system to extract data copied from an external application using a clipboard type feature and to paste it into an enriched application, for example to pre-fill a certain number in a particular text field.

Using a paste functionality for data transfer is not a new concept and many different products exist to do this. For example, it is possible to paste text data from Microsoft Access Databases into Microsoft Excel spreadsheets. In another known system, it is possible to import vector graphics in text format for computer aided design programs.

These known systems use paste functionality to parse input text data into a variety of formats, by pasting a graphical representation into their own user interfaces. However, neither system enables a paste function based on a form-based format such as those that may be required in the travel industry.

U.S. Pat. No. 6,192,380 (INTEL Corporation) discloses a method and system for automatically filling in a form in a web page in relationship with a database storing user data. The system comprises a form recognition unit to determine if data input is required for the form; a tag recognition unit to determine which kind of data is required; a matching unit to find and retrieve matching data in the database; and a learning subunit to update the database based on data manually entered by the user.

US 2006/0059247 (IBM Corporation) discloses a method for automatically filling in a form in a web page related to a user text file stored in a local memory. The system comprises a scanning module for scanning the stored text file to identify text tags and a pattern recognition controller for scanning the source code of the web page to identify the text tags and then to retrieve the matching text tags from the stored text file.

The above mentioned patent and application fail to address many of the problems associated with copy and paste functions between different applications as may be encountered in the travel industry, for example.

OBJECTS OF THE INVENTION

It is an object of the present invention to overcome at least some of the problems associated with the prior art.

It is a further object of the present invention to provide a system and method for improving the pasting function between different applications.

SUMMARY OF THE INVENTION

The present invention provides a method and system as set out in the accompanying claims.

According to a first aspect of the present invention there is provided a method of pasting text and graphics data from a source application to a destination application, where the source and destination applications are not the same; the method comprising the steps of: identifying whether the data is of text or graphics data type and selecting a text input handler if a text data type is identified and a graphics input handler if a graphics data type is identified; converting the data using the text or graphics input handler to a standard format for pasting based on the identified data type; determining semantics of the data in the standard format for pasting and a location of the user in the destination application, to which the data is to be pasted; determining which portions of the data is to be pasted to which areas of the determined location in the destination application, depending on the determined semantics of the data and the location of the user in the destination application; and pasting the data to the respective areas of the destination application.

Optionally, the determination of the location of the user is performed by using a context map which recognizes which page, mask, panel and/or field the user has selected in the destination application.

Optionally, the method further comprises the steps of obtaining a list of potentially suitable paste operations from a suggestion engine; presenting the list to the user for selection, depending on the semantics of the data and the location of the user in the destination application; and performing a paste operation according to a selection by the user.

Optionally, the method further comprises monitoring and processing the user selections by an artificial learning mechanism in order to adapt the lists maintained by the suggestion engine.

Optionally, the method further comprises applying an introspection process to the data prior to copying the data from the source application.

Optionally, the introspection process further comprises determining the semantics of the data to be pasted to a clipboard for the subsequent paste operation.

Optionally, the introspection process further comprises determining a format of the data to be copied.

Optionally, the introspection process further comprises using a selection device to select a region to copy.

According to a second aspect of the present invention there is provided a method of pasting data from a source application to a destination application, where the source and destination applications are not the same; the method comprising the steps of: identifying a data type for the data and an appropriate input handler for the data type; converting the data using the appropriate input handle to a standard format based on the data type; in an output module determining the context of the data in the standard format to identify an appropriate output handler; obtaining a suggested paste operation from a suggestion engine based on the type and context of the data; and instructing a paste operation on the basis of the suggested paste operation.

Optionally, the method further comprises identifying more than one possible suggested paste operation and generating a request for selection of the preferred suggested paste operation.

Optionally, the method further comprises storing the user response for future use in other similar circumstances.

Optionally. the method further comprises applying an introspection process to the data prior to commencing the paste operation.

Optionally, the introspection process further comprises determining the nature of the data to be pasted to a clipboard for the subsequent paste operation.

Optionally, the introspection process further comprises determining a format of the data to be copied.

According to another aspect, a system arranged to carry out the above method steps is provided.

According to another aspect, a computer program comprising instructions for carrying out the steps of the above method steps, when said computer program is executed on a computer system, is provided.

According to still another aspect, a non-transitory storage medium is provided which stores instructions for carrying out the steps of the methods as described above, when executed on a computer system.

The present invention provides at least the following advantages:

The pre-filling of multiple form elements in a travel reservation system can be achieved by using a simple paste operation.

The ability to parse multiple input types including language, grammar and other inputs from various reservation systems using an import mask and applying a paste command is provided.

The data can be entered into background tabs using a paste of parsable data.

All pasted fields may be highlighted in a unique color which allows the user to easily see the imported or pasted data.

The ability to intuitively select the information that is needed from an external application is provided. This has an added value compared with full integration systems: as the system gives the user the ability to control what should be integrated. By selecting what should be copied, the user has full control in a very natural way.

The application learns the behavior of the user and behaves in a default manner with increasing certainty over time.

BRIEF DESCRIPTION OF THE DRAWINGS

Reference will now be made, by way of example, to the accompanying drawings, in which.

DETAILED DESCRIPTION OF THE PREFERRED EMBODIMENTS

This invention deals with data import from a first (source) application to a second (target) application. For example from a travel reservation system and a customer management system into a graphical system, using the paste functionality of the graphical system. This provides a simple data input method that can be used in a graphical booking application environment for travel or other similar applications. In this example, the system also provides strong visual feedback on both the original content, and on the success of the data import. If necessary the user can also validate the success of the paste operation.

Complex paste operations for travel reservation systems of the present invention are novel and inventive and, unlike similar features which can be seen in spreadsheet applications, can be applied to non-tabular applications.

The present invention could also enable interaction between a Global Distribution System (GDS) with non GDS applications such as a website for a low cost carrier. A user could search for suggestions in an airline website and then go to the website of another provider and use the copy/paste mechanism of the present invention to transfer the search criteria from one application to another. This would avoid having to re-enter data and duplication of effort on the part of the user. The user could use the same search criteria and paste this into different applications thereby finding more possible suggestions which meet the search requirements.

The present invention also proposes a way to obtain data from an external system and to operate customized actions on the target application by means of an enhanced paste operation. The invention further provides an extension that does not apply a copy to clipboard functionality if required. These features will be described in greater detail below.

Figure 1:
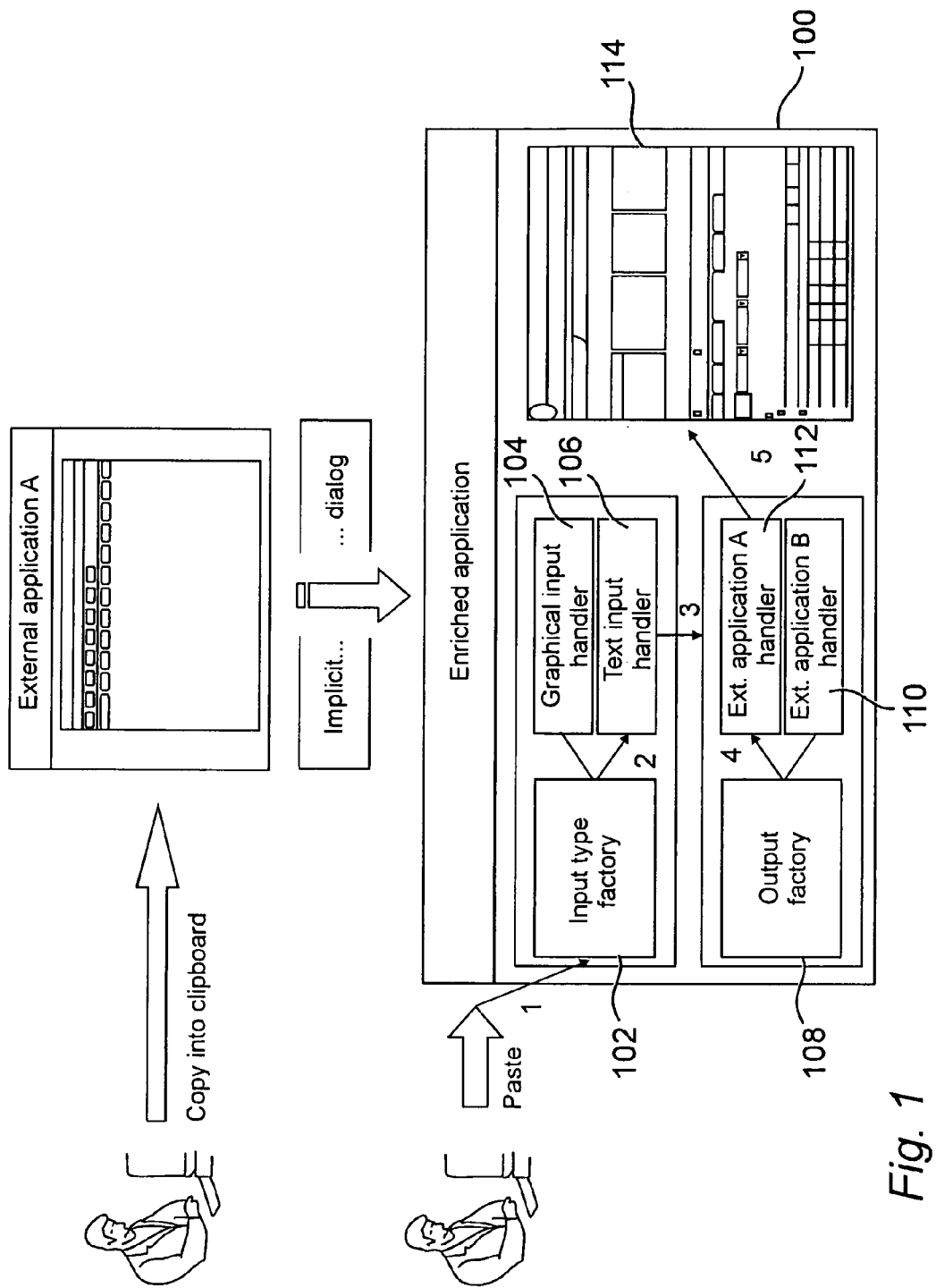
FIG. 1 is a schematic diagram of an overview of a paste function, in accordance with an embodiment of the invention.

Referring to FIG. 1, a schematic representation of a paste operation, in accordance with one embodiment of the invention, is shown. A user accesses an external application (A), which does not require any modified to operate with the system of the present invention. The user selects data and then uses a standard copy to clipboard functionality. The user then pastes the data into the enriched application 100 (also known as the enhanced paste system (EPS)). This starts the enriched processes of the present invention.

Once the user has pasted the data to the enhanced application, an input factory or module 102 is activated. The input factory attempts to determine the source of the data. This is carried out by any appropriate recognition technique and enables the enhanced application to identify the source application from which the data was copied. Having identified the source application the input factory can determine if any specific handling is required for the data and so can delegate an appropriate special handler.

The input factory has to determine if an enriched paste mechanism should be applied. If the user has copied 'normal text' into the clipboard so as to copy the normal text from one internal text field to another, a standard paste mechanism is all that is needed. In order to determine if the normal or enriched paste operation is required, the system makes a determination, as follows. If the user has identified a specific text field or area into which to paste the content of the clipboard, then a standard paste mechanism will be carried out. However, if the user is trying to paste to a "non pastable" area such as a number of different fields at the same time, then the enriched paste mechanism will be carried out, as will be described in greater detail below.

The specific handler (104, 106) selected by the input factory for the input source will depend on the source and the nature of the data, i.e. the data type and semantics. In the above example where text is being pasted, a text handler (106) will be used. The text handler will extract text data and convert it for later use. The handler could alternatively be a graphical handler (104) which could convert graphic data into a standard data format for pasting such as XML, by analyzing the graphic data that is copied. Different types of handler may be used for different types of data. In addition, for different handlers, the type of data can be of any appropriate type and is not limited to the example described above.

The data is sent from the handler to an output factory or module 108 which is activated based on standardized data which has been computed by the input handlers. The output factory is responsible for electing the correct output handler (110, 112) in order to process and generate the necessary output 114. The handlers in the input factory communicate the details of the enriched application to the output factory. In addition, the output factory knows which user interface screen has been activated and which action has to be taken based on the input data. This dependency of the user's "location" in the target application is hereinafter referred to as "context" of the input data to be pasted. For example, based on the context of text content, the correct text fields can be chosen and filled with data coming directly from the input data. In other words, a straight paste of unconverted data directly from the copy step is carried out. In another example, based on the context of graphic content, text may be recognized in the copied image data, converted to plain or formatted text, the correct text fields are chosen and filled with the correct portions of the converted text. On the other hand, if the context indicates that image data is to be pasted to certain locations in the enriched application, the unconverted copied image data or image data converted to another image format may be pasted to the right locations in the enriched application, depending on the context.

If there is any ambiguity in the data type, semantics or context of the input data, an intermediate popup (not shown) may appear to allow the user to make choices as required. The popup is an optional element which can be disabled thus allowing a user to rely on default values. If the popup is enabled a simplified set of options will be selectable by the user.

The output handlers can use regular-expression-style parsing to determine whether the data to be pasted is valid for the handler, and which fields need to be filled with which data. The order of the output handlers could also be changeable by the user, so that if more than one handler is valid, the one to be used can be changed or selected by the user.

The modifications of the user interface may be highlighted in a given color on screen so that the user is aware that data has been changed. Thus, the user can import the text data from any system easily and transparently and is aware of which fields have been changed during the operation. The changes can be indicated by color as mentioned above or by any other appropriate technique.

The paste mechanism of the present invention has created an implicit dialog between two applications, originally unable to have a dialog.

The detailed steps of the process to carry out the paste operations will be described with reference to FIGS. 5, 6 and 7.

As described with reference to FIG. 2, in some situations the copy functionality of the source application is not powerful enough for it to be used in conjunction with the paste mechanism of the present invention.

If this is the case, the invention provides a third stand-alone application referred to as the UI Agent 200.

The UI Agent application will carry out an introspection process on the external source application to analyze which data may be useful, and then copy the identified data into the clipboard.

Introspection is the capacity to determine the type of an object under investigation and is carried out on the external source application. The UI Agent cannot be used on all external applications, but can be used on applications using standard windows or internet controls. For example, the UI Agent could work with different types of application depending on the circumstances. For example, websites could be supported, using HTML DOM introspection. In this case, the UI Agent can identify the HTML DOM type, navigate within it, and then convert it as needed.

Instead of going directly to an external application, the user will use the UI Agent to carry out an introspection process on the application before the results are stored in the clipboard. Subsequent processing of the data continues as described with reference to FIG. 1 and the same reference number relates to equivalent elements.

In order for a user to select a particular region or set of fields to copy, the UI Agent may contain a simple "screen talker" that would copy an image of a region of the screen into the clipboard. A magic wand would also be used to select small areas. Similarly, other mechanisms to select fields or regions may also be used.

Figure 2:
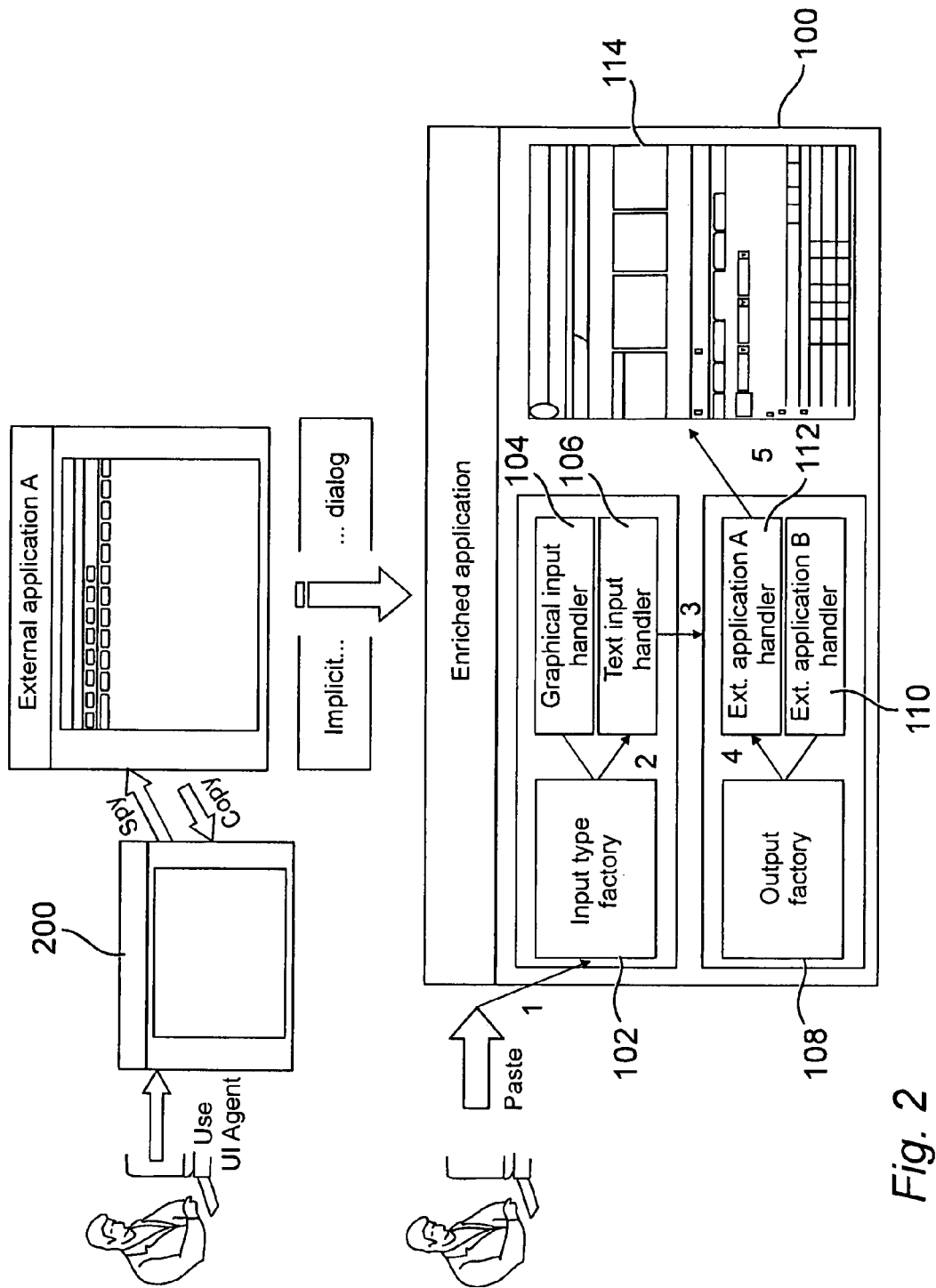
FIG. 2 is a schematic diagram of an overview of an alternative paste function, in accordance with an embodiment of the invention.

In either the FIG. 1 or FIG. 2 embodiment, once the Input Handler has analyzed the source and formatted the data into an appropriate Standard Format for Pasting (SFP) such as XML, the output handler exports or pastes the data to an external application. This can be carried out using the API of the external application. For example, the data could be pasted to Google Docs or Lotus Notes to add bookings into an agenda, etc. Using XML or a similar mark-up language as SFP is advantageous as it allows structuring the copied data and adding meta-information to it which can then be utilized for the enhanced pasting process, e.g. in order to paste the correct portions of the copied data into the correct locations of the target application.

Figure 3:
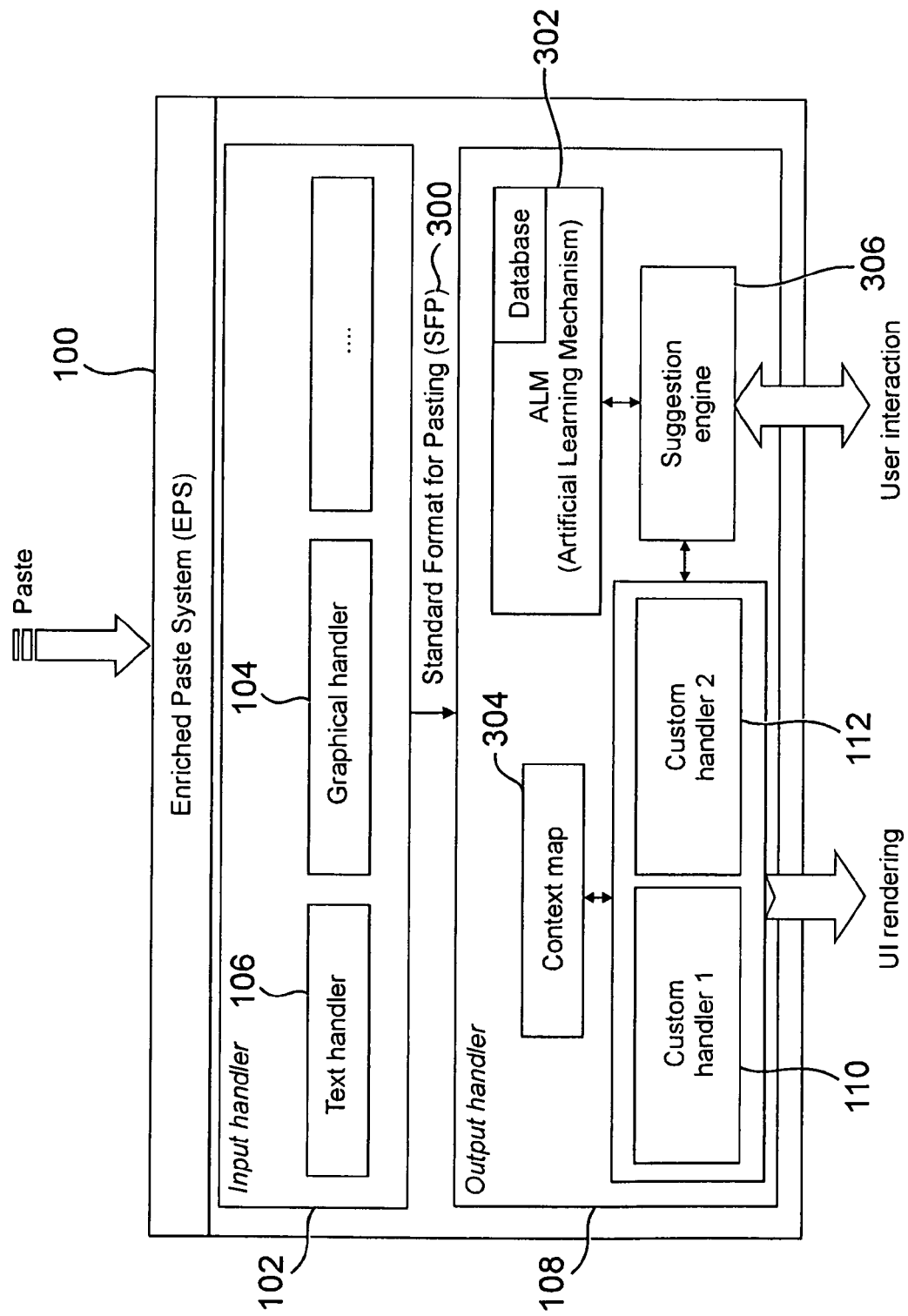
FIG. 3 is a block diagram of the architecture used to accomplish an enriched paste function in accordance with an embodiment of the invention.

Referring to FIG. 3, the enriched paste system (EPS) 100 is explained in more detail. FIG. 3 shows the input handler 102 and the output handler 108. The text handler and graphic handler 106 and 104 respectively are shown and produce a standard format 300 for pasting. The output handler includes an artificial learning mechanism (ALM) 302, for example by utilizing neural networks technology, including a database which stores information that can be accessed later. The information stored is choices made by the users when presented with suggestions. The ALM monitors choices of the user which portions of copied data to paste to which location in the enriched (target) application, collects and stores the relevant information and, if applicable, communicates with a suggestion engine 306 in order to modify the suggestion(s) stored therein for a particular pasting process (i.e. for pasting data of a particular type and particular semantics to a particular location in the enriched application). This will allow the suggestions that are presented to the user to change next time a similar situation occurs, e.g. when data of the same data type and/or of the same semantics is to be pasted to the same location in the enriched (target) application. The output handler also includes a context map 304. The context map allows determination of where the user is in the target application. For example, the user may have selected a certain page, mask, panel or field. Depending on the page, mask, panel or field, the behaviour of the paste mechanism may be different. The input handler 102 (called input type factory above) is used to determine the type of data that has been copied, as previously described above. The context map communicates with the custom handlers 110 and 112 respectively in the output handler. Both the artificial learning mechanism and the custom handlers may be linked to a suggestion engine 306 which provides a popup window through which the user can interact with the system. For example, the suggestion engine 306 stores a list of potentially suitable fields, cells or any other areas at the respective location of the enriched (target) application. If for a certain location, more than one area is suitable for pasting portions of the copied data, the set of potential areas are provided by the suggestion engine 306 to the user. The user can then manually choose the correct area(s) to which portions of the copied data are to be pasted. Additionally or alternatively, the suggestion engine 306 keeps a list of potentially suitable output and/or custom handlers from which potentially suitable handlers are presented to the user for selection, as described above. Through the automated operation of the output handler, and where necessary the user interaction by means of the suggestion engine, an appropriate custom handler is selected for outputting the relevant data to the target application. The paste function can then be completed.

Figure 4:
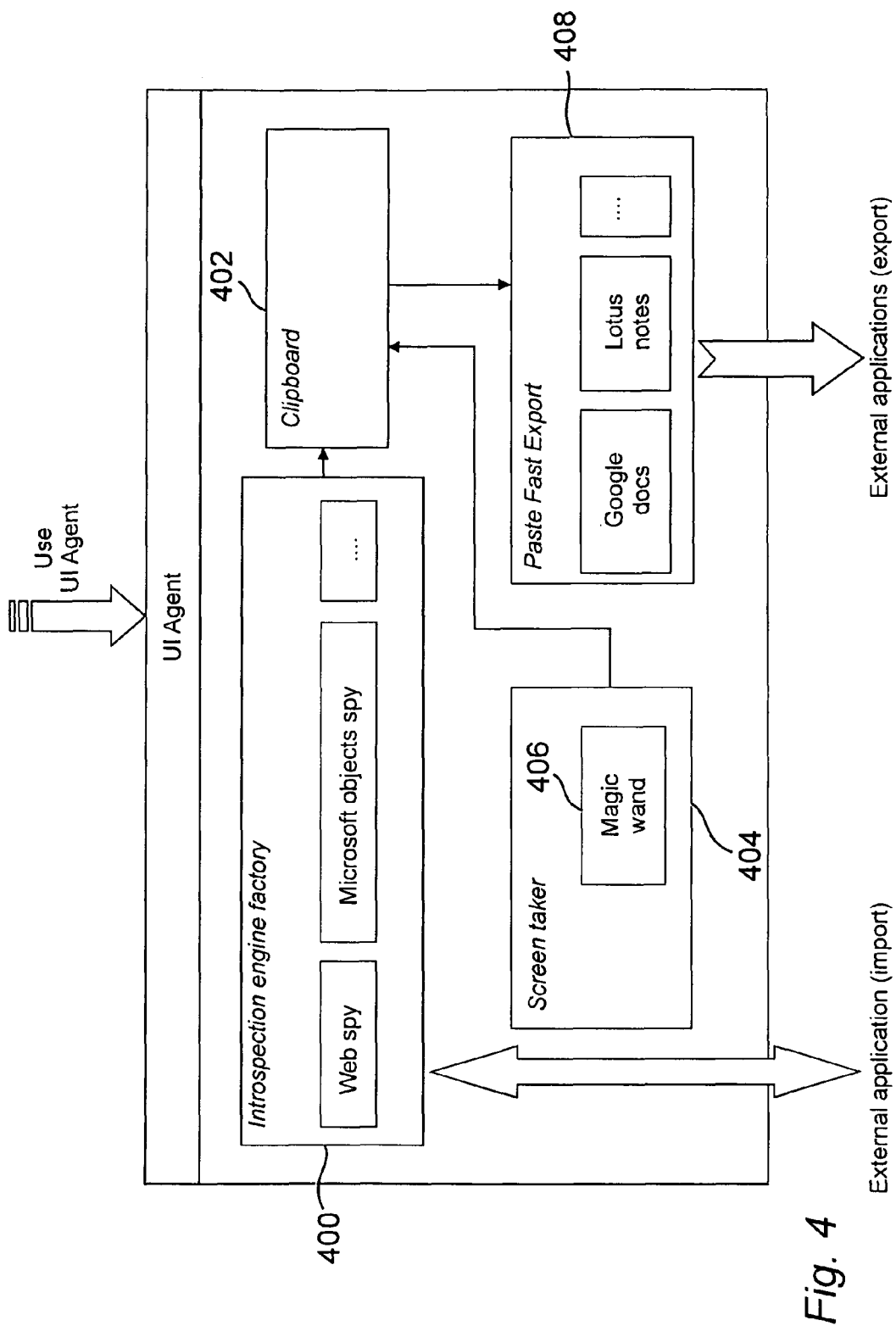
FIG. 4 is a block diagram of the architecture of the User Interface (UI) Agent in FIG. 2, in accordance with an embodiment of the invention.

Referring to FIG. 4 the UI Agent will now be described in greater detail. The UI Agent includes an introspection engine factory 400 which includes a number of different spy modules, such as a web spy, Microsoft objects spy or any other appropriate spy module. The introspection engine factory performs an introspection process as described above and copies data into a clipboard 402. Selection of the area to be copied can be made by means of the screen taker 404, a magic wand 406 or any other appropriate type of region capture methodology. The capture technology interacts with the clipboard to determine the appropriate regions for the subsequent paste step. The UI Agent also includes a fast export paste module 408 which enables data to be pasted into appropriate applications such as Google Docs, Lotus Notes etc.

As previously indicated, the present invention relates to a paste mechanism as described with reference to FIGS. 1 and 3 and an optional feature for augmenting the copying step by means of the UI Agent described in FIGS. 2 and 4. In this way, data can be copied from one source application and transferred to a target application by means of either a standard paste mechanism or an enhanced paste mechanism.

Figure 5:
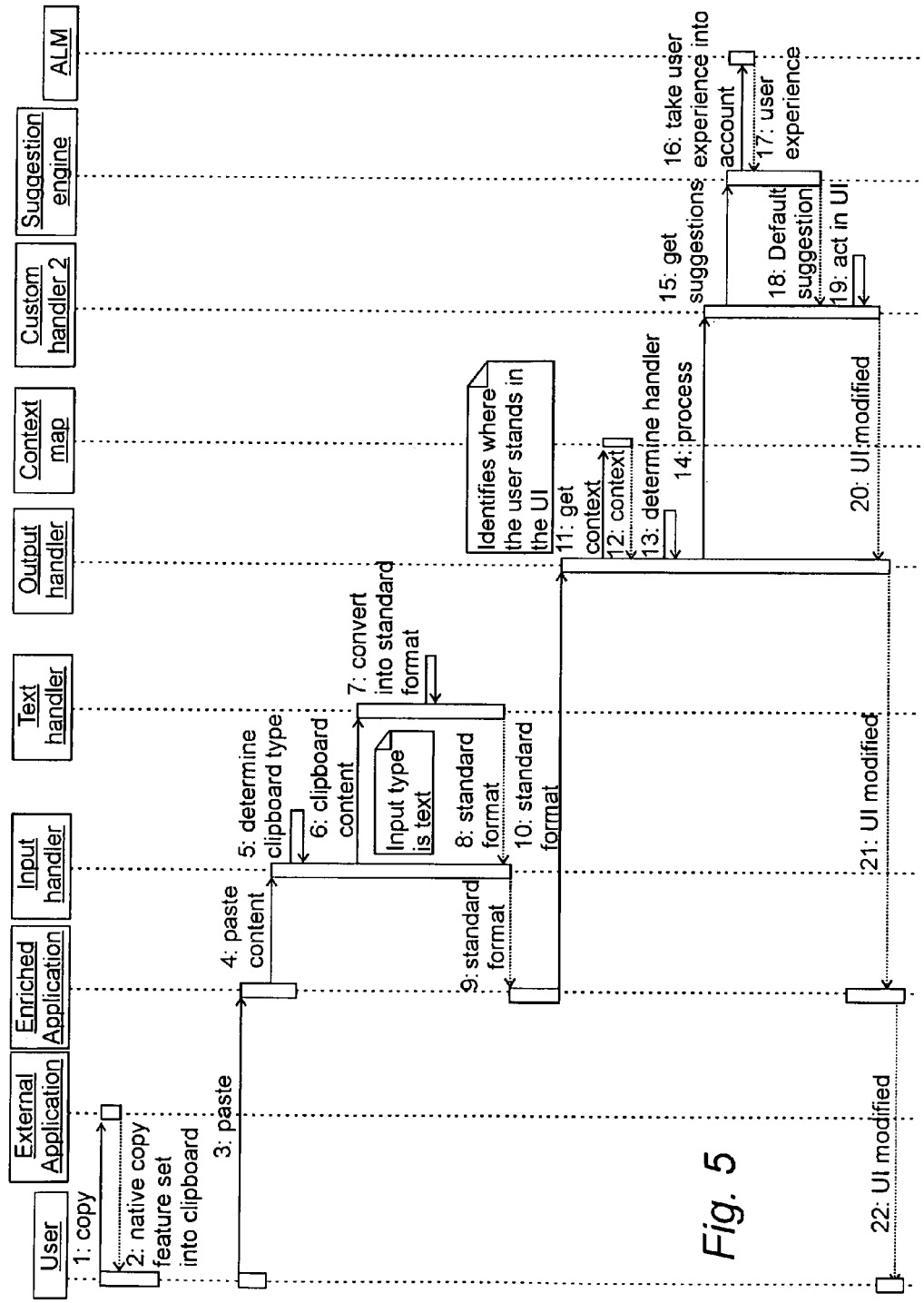
FIG. 5 is a sequence diagram of a quick paste routine, in accordance with an embodiment of the invention.

FIG. 5 shows a sequence diagram for an enhanced paste mechanism as described above. The numbers that follow relate to the sequence of steps that occur during the process. In step 1 the user selects a section of an external (source) application to copy. In step 2 the copied section is added to the clipboard. In step 3 the clipboard is pasted into the enriched (target) application and in step 4 the content is passed to the input handler. In step 5 the clipboard type is determined, for example input type is text or input type is graphic. The clipboard contents are then passed to the text handler in the case of text and the graphic handler in the case of graphics in step 6. In step 7 the text handler converts the clipboard content into a standard format for pasting (SFP). In steps 8 and 9 the standard format is returned to the input handler and the enriched application and then onto the output handler in step 10. The output handler then determines in step 11, the context of the standard format using the context map, i.e. where the user stands in the user interface (UI). Once the context has been communicated to the output handler in step 12 the output handler determines the appropriate custom handler to use in step 13. In step 14 the data is transferred to the appropriate custom handler (in this case custom handler 2) for further processing. The suggestion engine is then queried in step 15 to determine a suggestion of what should be pasted where. If the artificial learning mechanism is in operation, user preferences can be analyzed in step 16 and taken into account by the suggestion engine in step 17. The results of the suggestion engine and the artificial learning mechanism produce a default suggestion in step 18 to advise the custom handler of the paste actions to take. At step 19 the paste operation occurs and the user interface is modified in step 20. This is communicated to the output handler which in turn communicates the user interface modification to the enriched application in step 21. The enriched application then passes the user interface modification in step 22 to the user for confirmation of the correct operation.

Figure 6A:
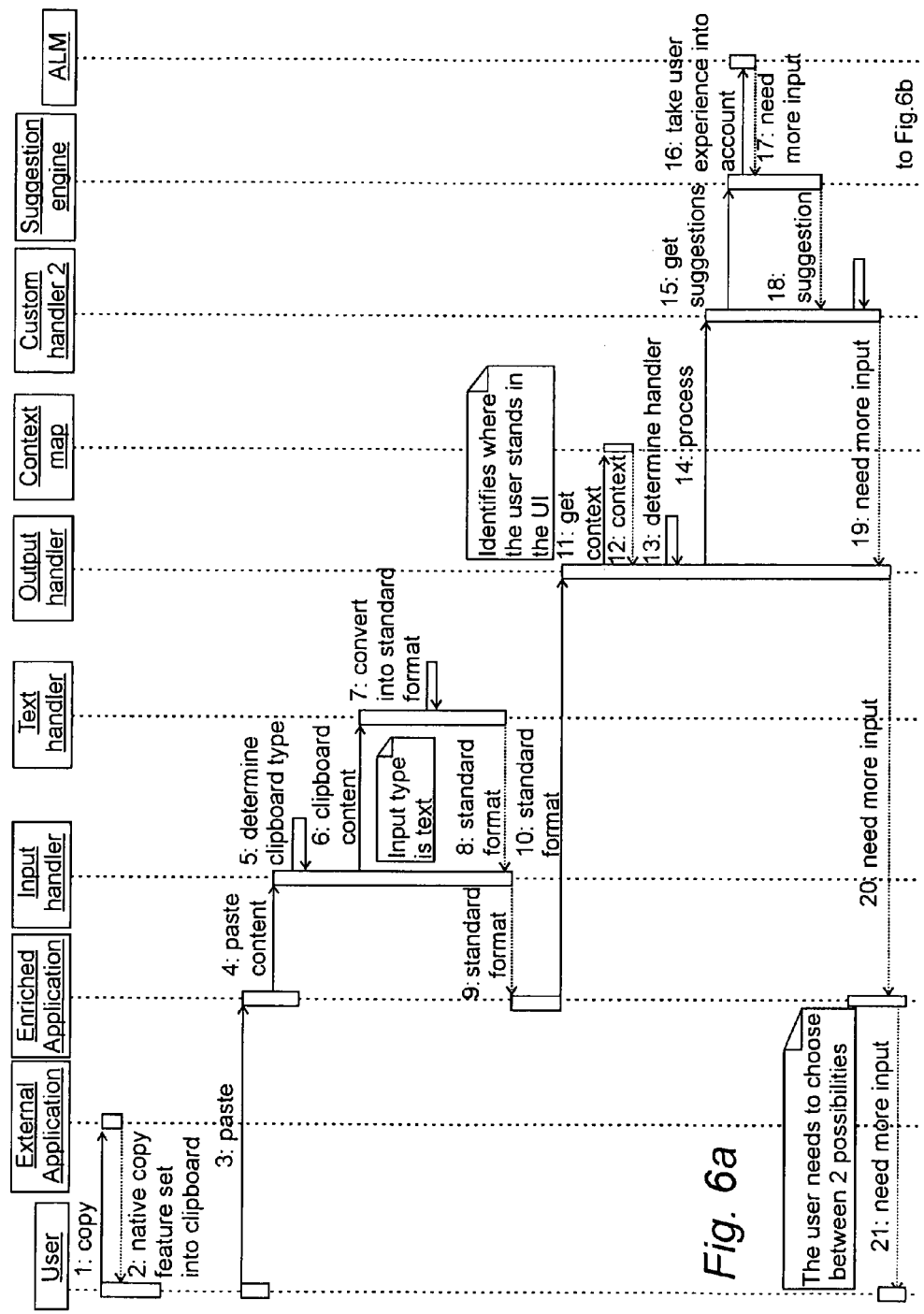
FIG. 6 is a sequence diagram of a paste routine with user interaction, in accordance with an embodiment of the invention.
Figure 6B:
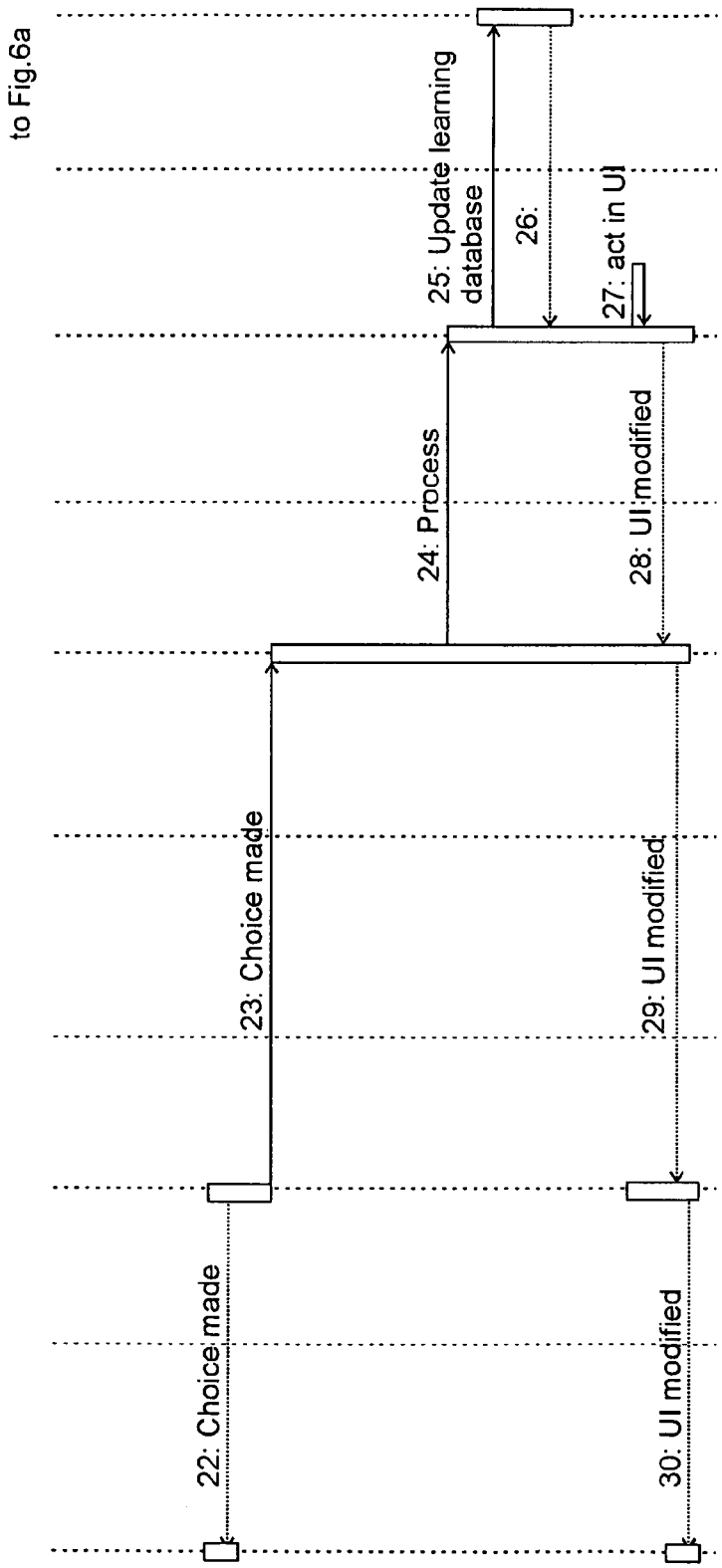

FIG. 6 shows a sequence diagram for an enhanced paste mechanism which offers the user the possibility to interact with the paste mechanism. The numbers that follow relate to the sequence of steps that occur during the process. In step 1 the user selects a section of an external (source) application to copy. In step 2 the copied section is added to the clipboard. In step 3 the clipboard is pasted into the enriched (target) application and in step 4 the content is passed to the input handler. In step 5 the clipboard type is determined, for example input type is text or input type is graphic. The clipboard contents are then passed to the text handler in the case of text and the graphic handler in the case of graphics in step 6. In step 7 the text handler converts the clipboard content into a standard format for pasting. In steps 8 and 9 the standard format is returned to the input handler and the enriched application and then onto the output handler in step 10. The output handler then determines in step 11 the context of the standard format using the context map, i.e. identifies where the user stands in the user interface. Once the context has been communicated to the output handler in step 12 the output handler determines the appropriate custom handler to use in step 13. In step 14 the data is transferred to the appropriate custom handler (in this case custom handler 2) for further processing. The suggestion engine is then queried in step 15 to determine a suggestion of what should be pasted where. If the artificial learning mechanism is in operation, user preferences can be analysed in step 16. In this case the system is unable to make a single suggestion, and instead has a number of possible suggestions. This results in a request for more information in step 17. A list of possible suggestions is produced in step 18 and passed to the custom handler. At step 19 a request for further input is created and communicated to the output handler. In steps 20 and 21 this request is passed to the user so that the user can select one of the possible options. At step 22 the user indicates the choice which is then communicated to the enriched application. The enriched application then transfers the choice to the output handler in step 23. The choice is processed by the output handler and passed to the custom handler in step 24 which then updates the artificial learning mechanism at step 25. At step 26 the selected paste operation is communicated to the custom handler 2 and action required on the user interface is determined in step 27. The user interface modification is communicated from the custom handler to the output handler in step 28; from the output handler to the enriched application in step 29; and from the enriched application to the user in step 30.

Figure 7:
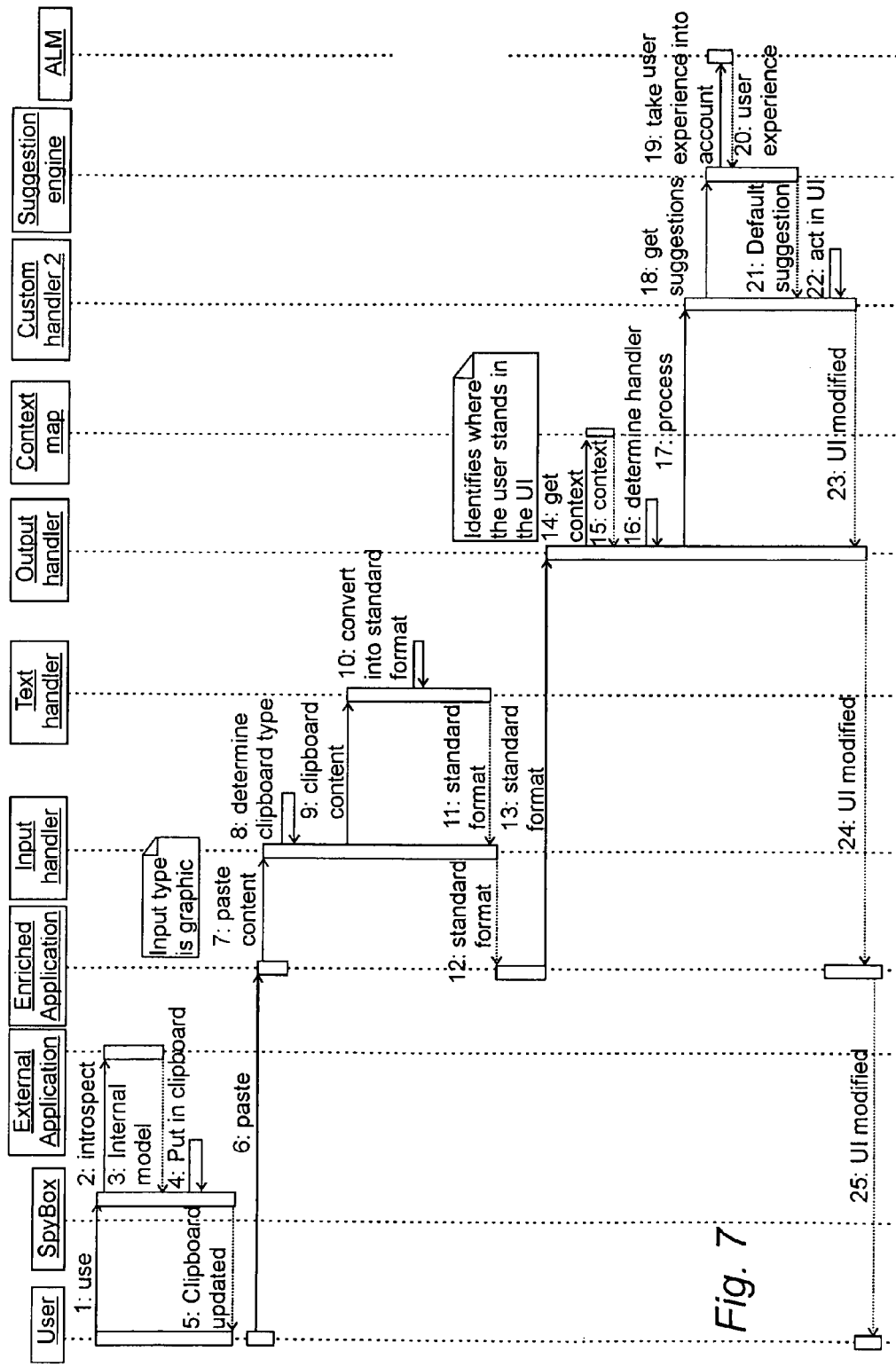
FIG. 7 is a sequence diagram of a further paste routine in accordance with an embodiment of the invention.

FIG. 7 shows a sequence diagram for an enhanced paste mechanism using the UI Agent. The numbers that follow relate to the sequence of steps that occur during the process. In step 1 the user selects a section of an external application to copy. An introspection mechanism is carried out in the UI Agent at step 2. The type of data is identified and communicated from the enhanced application to the UI Agent in step 3. The UI Agent then puts the data into the clipboard at step 4 which is then updated and presented to the user in step 5. Thereafter the process continues with steps 6 to 25 which are equivalent to steps 3 to 22 respectively in FIG. 5. The processes carried out in each successive step are identical to those described with reference to FIG. 5 above although the numbers of each step are different as indicated above.

Figure 8:
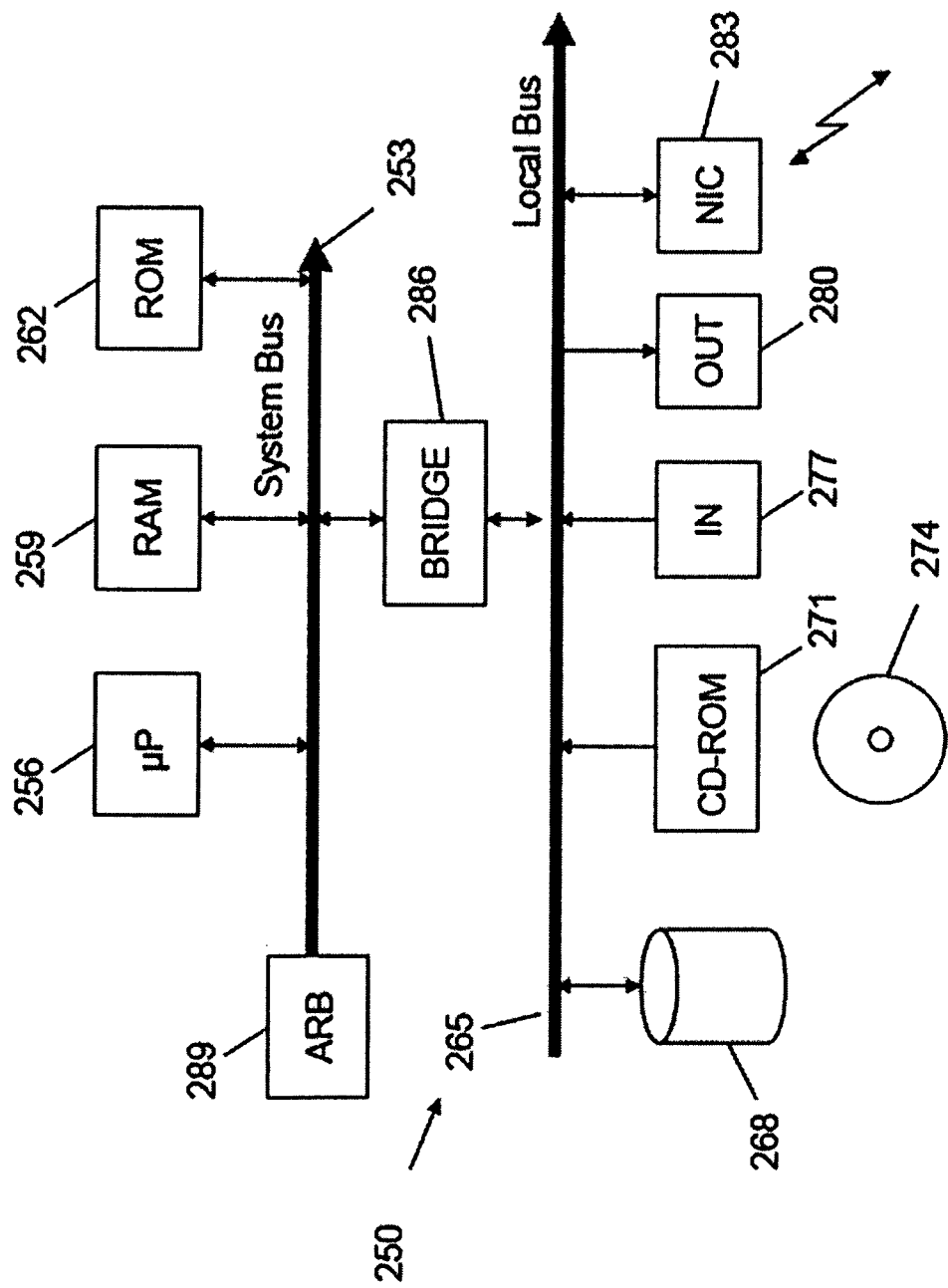
FIG. 8 is a diagram of a computer system in accordance with an embodiment of the invention.

A possible technical implementation of a system carrying out the paste method is depicted in FIG. 8. In FIG. 8, the system is a computer 250 which is formed by several units that are connected in parallel to a system bus 253. In detail, one or more microprocessors 256 control operation of the computer 250; a RAM 259 is directly used as a working memory by the microprocessors 256, and a ROM 262 stores basic code for a bootstrap of the computer 250. Peripheral units are clustered around a local bus 265 (by means of respective interfaces). Particularly, a mass memory for storing the instructions implementing the various modules of the Enhanced Paste System, i.e. the factories, the input and output handlers, the suggestion engine, the UI agent as well as the data of the artificial learning mechanism, as well as the ALM database described herein, consists of a hard-disk 268 and a drive 271 for reading CD-ROMs 274. Moreover, the computer 250 includes input devices 277 (for example, a keyboard and a mouse), and output devices 280 (for example, a monitor and a printer). A Network Interface Card 283 is used to connect the computer 250 to a network. A bridge unit 286 interfaces the system bus 253 with the local bus 265. Each microprocessor 256 and the bridge unit 286 can operate as master agents requesting an access to the system bus 253 for transmitting information. An arbiter 289 manages the granting of the access with mutual exclusion to the system bus 253. Similar considerations apply if the system has a different topology, or it is based on other networks.

The present invention is described with reference to transferring data from one application to another in the travel environment. However, the invention could apply to many other domains.

The present invention has been described with reference to both software programs and applications and hardware modules. It will be appreciated that the functions carried out as part of the invention could be carried out in either software or hardware modules or any combination thereof, irrespective of the examples given herein.

It will be appreciated that there are many variations of the various features described above, which can fall within the scope of the present invention.

The invention claimed is:

1. A method of pasting data from a source application to a destination application differing from the source application, the method comprising:
   identifying, with an input module at the destination application, whether the data is of text data type or graphics data type and the source application from which the data was copied;
   selecting a text input handler with the input module at the destination application based upon if the text data type is identified;
   selecting a graphics input handler with the input module at the destination application based upon if the graphics data type is identified;
   converting the data using the text input handler or the graphics input handler to a standard format for pasting based on the identified data type;
   after the data is converted to the standard format, determining semantics of the data with an output module at the destination application, and a context being defined by a location of a user in the destination application or a selection by the user in a user interface of the destination application, to which the data is to be pasted;
   selecting, with the output module at the destination application, one of a plurality of custom handlers at the destination application based on the identified source application and transmitting the data to the determined custom handler;
   presenting, with the determined custom handler and based on the determined semantics of the data and the context, a list, from a suggestion engine adapted by an artificial learning mechanism, of potentially suitable paste operations for selection by the user at the destination application;
   and
   pasting the data to the respective areas of the destination application based on a selection of an operation from the list of potentially suitable paste operations by the user.

2. The method of claim 1, wherein the determination of the location of the user is performed by using a context map which recognizes which page, mask, panel, and/or field the user has selected in the destination application.

3. The method of claim 1, further comprising:
   monitoring and processing the user selections by the artificial learning mechanism in order to adapt the lists maintained by the suggestion engine.

4. The method of claim 1, further comprising:
   applying an introspection process to the data prior to copying the data from the source application.

5. The method of claim 4, wherein applying the introspection process comprises:
   determining the semantics of the data to be pasted to a clipboard for the subsequent paste operation.

6. The method of claim 4, wherein applying the introspection process comprises:
   determining a format of the data to be copied.

7. The method of claim 4, wherein applying the introspection process comprises:
   using a selection device to select a region to copy.

8. A method of pasting data from a source application to a destination application differing from the source application, the method comprising:

identifying, with an input module at the destination application, a data type for the data and the source application from which the data was copied;
identifying an input handler from a plurality of input handlers with the input module at the destination application based upon the data type;
converting the data using the input handler to a standard format based on the data type;
after the data is converted to the standard format, determining the semantics of the data with an output module at the destination application, and a context being defined by a location of a user in the user interface of the destination application or a selection by the user in the user interface of the destination application;
selecting, with the output module at the destination application, one of a plurality of custom handlers at the destination application based on the identified source application and transmitting the data to the determined custom handler;
presenting, with the determined custom handler and based on the determined semantics of the data and the context, a list, from a suggestion engine adapted by an artificial learning mechanism, of potentially suitable paste operations for selection by the user at the destination application; and
instructing a paste operation of the data based upon a selection of an operation from the list of potentially suitable paste operations by the user.

9. The method of claim 8, further comprising:
storing a user response to the request for determining user trends for future use.

10. The method of claim 8, further comprising:
applying an introspection process to the data prior to commencing the paste operation.

11. The method of claim 10, further comprising:
determining the semantics of the data to be pasted to a clipboard for the subsequent paste operation.

12. The method of claim 10, further comprising:
determining a format of the data to be copied.

13. The method of claim 10, further comprising:
using a selection device to select a region to copy.

14. The method of claim 8, further comprising:
selecting the input or the output handler from at least a text handler and a graphics handler.

15. The method of claim 8, further comprising:
monitoring and processing the user selections by the artificial learning mechanism in order to adapt the lists maintained by the suggestion engine, which stores user responses for determining user trends.

16. A system for pasting data from a source application to a destination application-differing from the source application, the system comprising:
at least one processor; and
a memory coupled with the at least one processor, the memory including program instructions that, when executed by the at least one processor, cause the apparatus to:
identify, with an input module at the destination application, whether the data is of text data type or graphics data type and the source application from which the data was copied;
select a text input handler with the input module at the destination application based upon if the text data type is identified;
select a graphics input handler with the input module at the destination application based upon if the graphics data type is identified;
convert the data using the text input handler or the graphics input handler to a standard format for pasting based on the identified data type;
after the data is converted to the standard format, determine semantics of the data with an output module at the destination application, and a context being defined by a location of a user in the destination application or a selection by the user in a user interface of the destination application, to which the data is to be pasted;
select, with the output module at the destination application, one of a plurality of custom handlers at the destination application based on the identified source application and transmitting the data to the determined custom handler;
present, with the determined custom handler and based on the determined semantics of the data and the context, a list, from a suggestion engine adapted by an artificial learning mechanism, of potentially suitable paste operations for selection by the user at the destination application;
and
paste the data to the respective areas of the destination application based on a selection of an operation from the list of potentially suitable paste operations by the user.

17. A system for pasting data from a source application to a destination application differing from the source application, the system comprising:
at least one processor; and
a memory coupled with the at least one processor, the memory including program instructions that, when executed by the at least one processor, cause the apparatus to:
identify a data type for the data;
identify, with an input module at the destination application, an input handler from a plurality of input handlers with an input module at the destination application based upon the data type and the source application from which the data was copied;
convert the data using the input handler to a standard format based on the data type;
after the data is converted to the standard format, determine the semantics of the data with an output module at the destination application, and a context being defined by a location of a user in a user interface of the destination application or a selection by the user in the user interface of the destination application;
select, with the output module at the destination application, one of a plurality of custom handlers at the destination application based on the identified source application and transmitting the data to the determined custom handler;
present, with the determined custom handler and based on the determined semantics of the data and the context, a list, from a suggestion engine adapted by an artificial learning mechanism, of potentially suitable paste operations for selection by the user at the destination application; and
instruct a paste operation of the data based on a selection of an operation from the list of potentially suitable paste operations by the user.

* * * * *